US012644733B2

(12) United States Patent
Moser

(10) Patent No.: US 12,644,733 B2
(45) Date of Patent: Jun. 2, 2026

(54) HOUSING OF A FIELD DEVICE IN MEASUREMENT AND AUTOMATION TECHNOLOGY, AND FIELD DEVICE OF THIS TYPE

(71) Applicant: Endress+Hauser Flowtec AG, Reinach (CH)

(72) Inventor: Thiérry Moser, Sierentz (FR)

(73) Assignee: Endress+Hauser Flowtec AG, Reinach (CH)

( * ) Notice: Subject to any disclaimer, the term of this patent is extended or adjusted under 35 U.S.C. 154(b) by 268 days.

(21) Appl. No.: 18/556,740

(22) PCT Filed: Mar. 21, 2022

(86) PCT No.: PCT/EP2022/057324

§ 371 (c)(1),
(2) Date: Oct. 23, 2023

(87) PCT Pub. No.: WO2022/223211

PCT Pub. Date: Oct. 27, 2022

(65) Prior Publication Data

US 2024/0240975 A1      Jul. 18, 2024

(30) Foreign Application Priority Data

Apr. 22, 2021     (DE) ...................... 10 2021 110 343.6

(51) Int. Cl.
   *G01D 11/24*          (2006.01)
(52) U.S. Cl.
   CPC .................................. *G01D 11/245* (2013.01)
(58) Field of Classification Search
   CPC .................................................. G01D 11/245
   See application file for complete search history.

(56) References Cited

U.S. PATENT DOCUMENTS

2020/0256716 A1 * 8/2020 Gronauer ................ G01F 15/14

FOREIGN PATENT DOCUMENTS

| DE | 102006056649 A1 * | 6/2005 | ............. G01F 15/14 |
| DE | 102005059662 A1 | 6/2007 | |
| DE | 102012111662 A1 * | 6/2014 | .......... G01D 11/245 |
| DE | 102013011633 B3 * | 10/2014 | .......... H05K 7/1462 |
| DE | 102017009931 A1 * | 4/2019 | ............. G01F 15/06 |
| DE | 102018132061 A1 | 6/2020 | |
| DE | 102019135583 A1 | 6/2021 | |
| FR | 1125551 A * | 11/1956 | |
| WO | WO-2010006838 A1 * | 1/2010 | ........... B60T 17/043 |

* cited by examiner

*Primary Examiner* — Jamel E Williams
(74) *Attorney, Agent, or Firm* — Kelly J. Smith; Endress+Hauser (USA) Holding, Inc.

(57) ABSTRACT

The invention relates to a housing of a field device, comprising:
   a housing body having a housing wall,
   a lid, which is applied at an opening of the housing wall,
   wherein the lid includes an annular body and a pane,
   wherein the pane has two opposite faces and an edge connecting the faces,
   characterized in that
   the edge has a groove running around the pane, wherein the annular body has an inner groove,
   wherein the groove of the annular body surrounds the groove of the pane, wherein the groove of the annular body and the groove of the pane form a first corridor,
   wherein the first corridor is filled out with a sealing compound and/or wherein a cable or a plurality of spheres is present in the first corridor.

11 Claims, 2 Drawing Sheets

HOUSING OF A FIELD DEVICE IN MEASUREMENT AND AUTOMATION TECHNOLOGY, AND FIELD DEVICE OF THIS TYPE

CROSS-REFERENCE TO RELATED APPLICATIONS

The present application is related to and claims the priority benefit of DPMA Patent Application No. 10 2021 110 343.6, filed on Apr. 22, 2021 and International Patent Application No. PCT/EP2022/057324, filed on Mar. 21, 2022, the entire contents of which are incorporated herein by reference.

TECHNICAL FIELD

The invention relates to a housing of a field device of measurement- and automation technology with a lid for closing the housing. Known from the state of the art (see e.g. DE102018132061A1) are embodiments, in the case of which a transparent pane is pressed against the housing by means of a lid element. Usually an operating electronics is located behind the pane. Disadvantageous in this is that the lid claims space perpendicularly to the pane, such that a depression is formed. In this way, water, for example, can collect on the pane. Moreover, this also hampers servicing of the field device with a smart phone using near-field communication.

BACKGROUND

As object of the invention is to provide a housing of a field device of measurement- and automation technology, in the case of which above mentioned disadvantages are prevented.

The object is achieved by a housing as defined in independent claim 1 as well as by a field device as defined in independent claim 8.

SUMMARY

A housing of the invention for a field device of measurement- and automation technology comprises:
- a housing body having a housing wall enclosing an internal volume,
- a lid, which is applied at an opening of the housing wall and tightly seals such,
- wherein the lid includes an annular body and a pane,
  - wherein the annular body is applied at the opening and secured to the housing body, and wherein the pane is inserted in the annular body and tightly seals the opening,
- wherein the pane has two opposite faces and an edge,
- wherein the edge has a groove running around the pane,
  - wherein the annular body has an inner groove, wherein the groove of the annular body surrounds the groove of the pane, wherein the groove of the annular body and the groove of the pane form a first corridor,
  - wherein the first corridor is filled out with a sealing compound and/or wherein a cable or a plurality of spheres is present in the first corridor.

The spheres or cable can be made of a metal, for example, steel. The cable can be a wire rope. The sealing compound can be, for example, silicone, especially having a hardness between 25 Shore A and 75 Shore A.

The assembly can, thus, be compactly embodied. By means of the cable or the spheres, the pane can be solidly anchored in the annular body, such that, in this way, EX-d safety can be assured.

In an embodiment, the first corridor has a first diameter, wherein the cable, or the spheres, has/have a second diameter, wherein the second diameter is at least 60% and, especially, at least 70% and preferably at least 80% of the first diameter.

In an embodiment, the lid has on an internal volume facing face of the lid a peripheral, inwards protruding projection, or shoulder, which forms with the pane a second corridor, wherein there is arranged in the second corridor a sealing ring, which is adapted to provide an elastic seating of the pane.

In an embodiment, the second corridor is filled out with a sealing compound.

In this way, an elastic seating of the pane can be improved.

In an embodiment, an outer face of the pane is flush with the annular body.

In this way, an accumulation of liquid in the region of the pane can be prevented. Moreover, then a servicing of a field device with housing of the invention using near-field communication (NFC) is facilitated.

In an embodiment, the annular body and/or the pane have/has at least one inlet for insertion of the spheres, or the cable.

In this way, construction of the housing is facilitated.

In an embodiment, the pane is transparent.

In an embodiment, the annular body, as well as the pane as well as the spheres, or the cable, comprise at least one of the following materials:
aluminum, stainless steel, glass, plastic.

In an embodiment, the housing is formed to provide EX-d safety,
  - wherein the pane has a minimum thickness of 10 millimeters, wherein the pane is made of aluminum, a stainless steel, or a glass, A field device of the invention for measurement- and automation technology comprises:
  - a housing as described in one of the descriptions above,
  - a measuring transducer;
  - an electronic measuring/operating circuit for operating the measuring transducer and for providing measured values of a measured variable, wherein the electronic measuring/operating circuit is arranged in the housing.

BRIEF DESCRIPTION OF THE DRAWINGS

The present disclosure will now be described based on examples of embodiments presented in the appended drawing, the figures of which show as follows.

DETAILED DESCRIPTION

Figure 1:
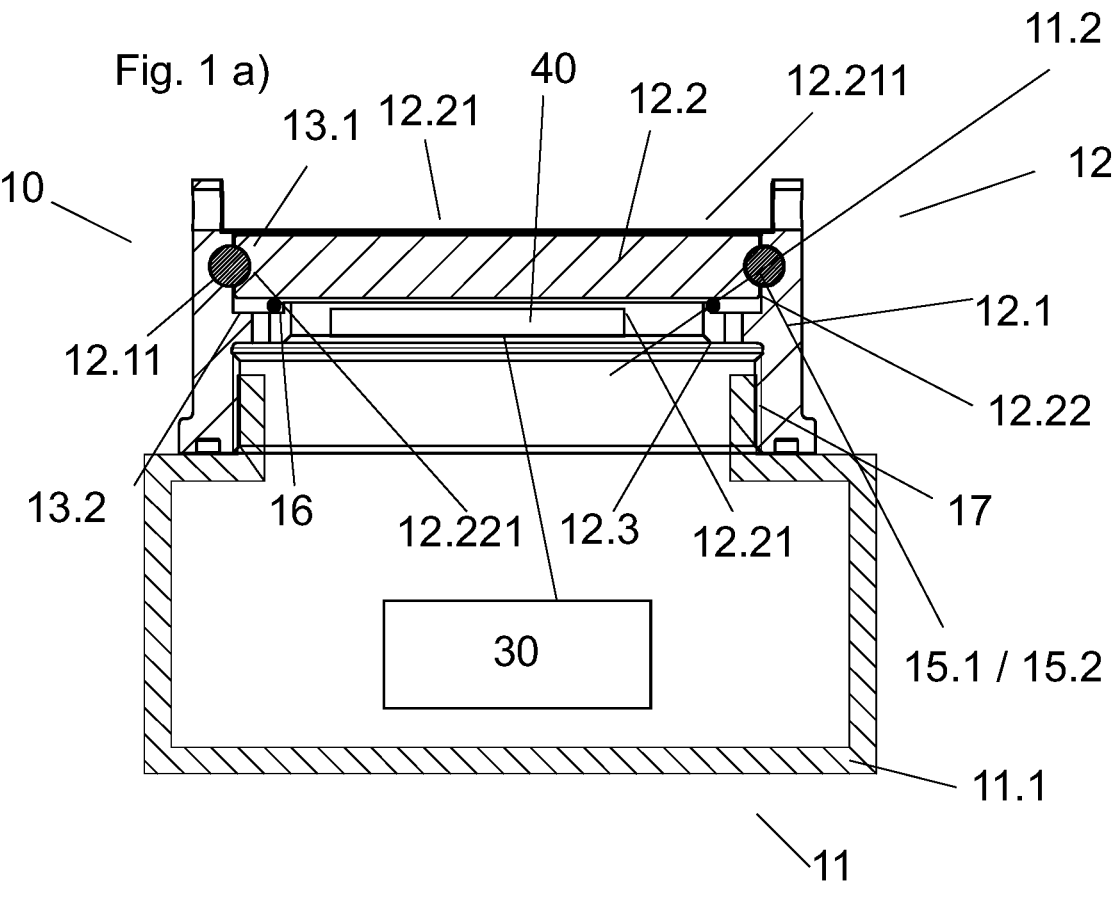
FIG. 1a) shows structure of a housing of the invention for a field device of measurement—and automation technology, with a lid of the present disclosure.
FIG. 1b) shows a plan view of the lid.
FIG. 1c) shows an oblique view of the lid.
Figure 1:
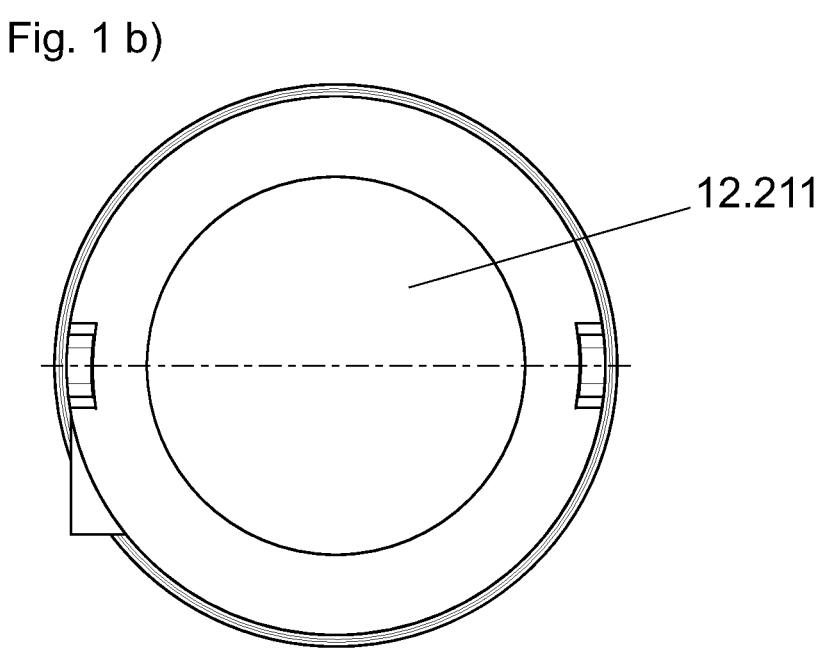

FIG. 1 a) shows a section through an example of a housing 10 of the invention for a field device of measurement- and automation technology with a lid. FIG. 1 b) shows a plan view of the lid and FIG. 1 c) an oblique view. The lid includes an annular body 12.1, in which a pane 12.2 is inserted. The pane has opposite faces 12.21 and an edge 12.22, which spaces the faces from one another. Housing 10 includes a housing body 11 with a housing wall 11.1 surrounding an internal volume.

The edge includes a pane groove 12.221, which is arranged at the height of a body groove 12.11, such that a first corridor 13.1 is formed. The first corridor can be filled, in such case, with a sealing compound and/or can, such as shown here, accommodate a cable 15.2 or a plurality of spheres 15.1. The first corridor has a first diameter, wherein the cable, or the spheres, have a second diameter, wherein the second diameter is, for example, at least 70% and, especially, at least 80% and preferably at least 90% of the first diameter. In this way, the pane is locked in the annular body. The lower the difference between first diameter and second diameter, the solider and safer the locking of the pane in the annular body. In this way, the apparatus can be formed to provide EX-d safety.

The lid can, such as shown here, have protruding inwards toward a longitudinal axis of the lid a projection, or shoulder, 12.3, which forms with the pane a second corridor 13.2, wherein there is arranged in the second corridor a sealing ring 16, which is adapted to provide an elastic seating of the pane.

For example, when a plurality spheres or a cable is arranged in the first corridor, in order to assure EX-d safety, the filling of the second corridor with a sealing compound can be advantageous, since with the presence of the spheres, or the cable, the first corridor can be filled out supplementally with sealing compound only with difficulty.

In an embodiment, the pane is transparent.

Figure 2:
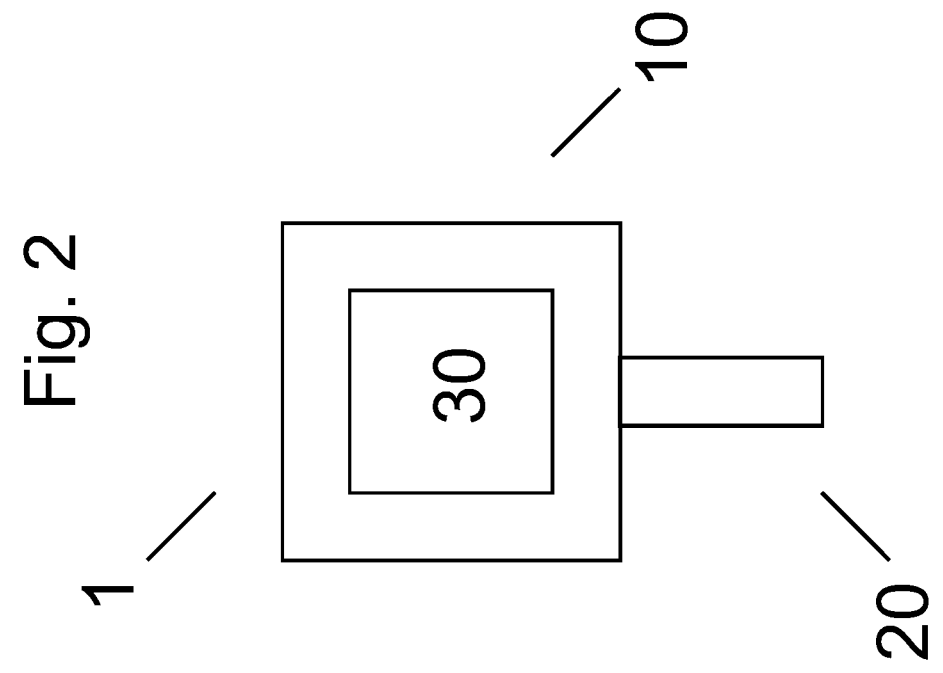
FIG. 2 shows a schematic example of a field device of measurement and automation technology
Figure 1:
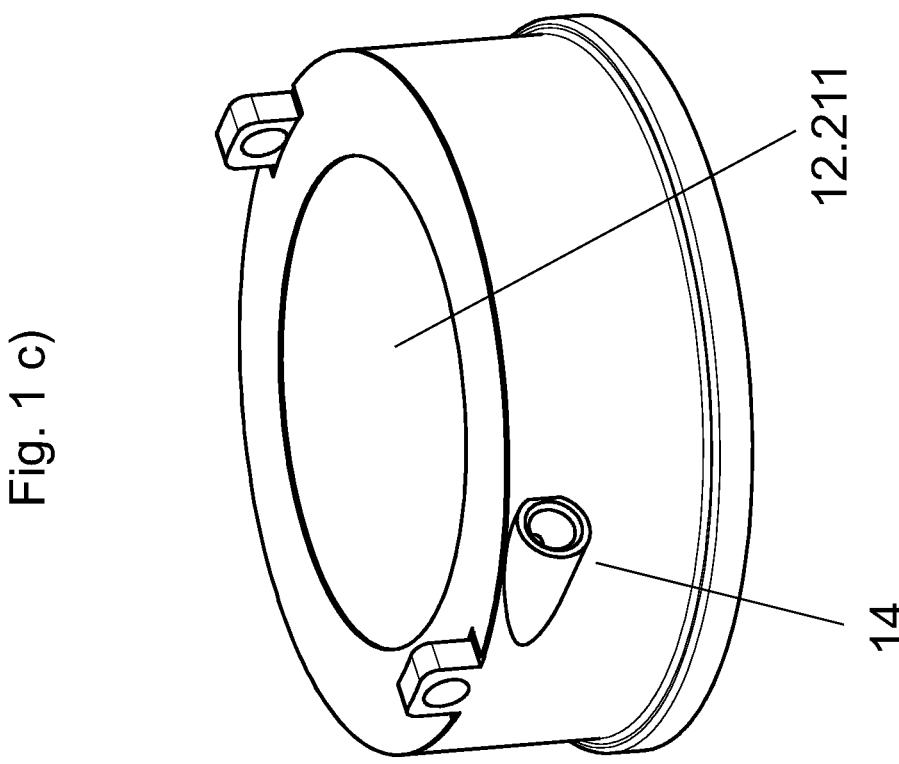

The internal volume is adapted to accommodate an electronic measuring/operating circuit 30 of the field device (see also FIG. 2). The electronic measuring/operating circuit 30 is adapted to operate a measuring transducer of the field device and to provide measured values of a measured variable. Furthermore, a display device 40 can be provided, in order to display information to a user of the field device.

The lid can, in such case, such as indicated here, be secured to the housing via a screw thread connection 17, wherein, such as here, the lid has, for example, an internal screw thread. Alternatively, also designs are an option, in the case of which the lid has an outer screw thread.

FIG. 2 shows the structure of an example of field device 1, which has a housing 10, a measuring transducer 20 connected with the housing, and an electronic measuring/operating circuit 30.

The invention claimed is:

1. A housing of a field device of measurement and automation technology, comprising:
   a housing body having a housing wall enclosing an internal volume;
   a lid, which is applied at an opening of the housing wall and tightly sealing such;
   wherein the lid includes an annular body and a pane, wherein the annular body is applied at the opening and secured to the housing body, and wherein the pane is inserted in the annular body and seals the opening;
   wherein the pane has two opposite faces and an edge;
   wherein the edge has a groove running around the pane, wherein the annular body has an inner groove, wherein the groove of the annular body surrounds the groove of the pane, wherein the groove of the annular body and the groove of the pane form a first corridor;

wherein the first corridor is filled out with a sealing compound and/or wherein a cable or a plurality of spheres is present in the first corridor;
   wherein the lid has, on an internal volume facing face of the lid, an inwards protruding projection which forms with the pane a second corridor, wherein there is arranged in the second corridor, a sealing ring adapted to provide an elastic seating of the pane.

2. The housing of claim 1, wherein the first corridor has a first diameter, wherein the cable, or the spheres, has/have a second diameter, wherein the second diameter is at least 70% of the first diameter.

3. The housing of claim 1, wherein the second corridor is filled out with a sealing compound.

4. The housing of claim 1, wherein an outer face of the pane is flush with the annular body.

5. The housing of claim 1, wherein annular body and/or the pane have/has at least one inlet for insertion of the spheres, or the cable.

6. The housing of claim 1, wherein the pane is transparent.

7. The housing of claim 1, wherein the annular body, the pane, the spheres, or cable include aluminum, stainless steel, glass, or plastic.

8. The housing of claim 1, wherein:
   the housing is formed to provide EX-d safety; and
   wherein the pane has a minimum thickness of 10 millimeters, wherein the pane is made of aluminum, a stainless steel, or a glass.

9. A field device of measurement and automation technology, comprising:
   a housing including:
   a housing body having a housing wall enclosing an internal volume;
   a lid, which is applied at an opening of the housing wall and tightly sealing such;
   wherein the lid includes an annular body and a pane, wherein the annular body is applied at the opening and secured to the housing body, and wherein the pane is inserted in the annular body and seals the opening;
   wherein the pane has two opposite faces and an edge;
   wherein the edge has a groove running around the pane, wherein the annular body has an inner groove, wherein the groove of the annular body surrounds the groove of the pane, wherein the groove of the annular body and the groove of the pane form a first corridor;
   wherein the first corridor is filled out with a sealing compound and/or wherein a cable or a plurality of spheres is present in the first corridor;
   a measuring transducer;
   an electronic measuring/operating circuit for operating the measuring transducer and for providing measured values of a measured variable, wherein the electronic measuring/operating circuit is arranged in the housing;
   wherein the lid has, on an internal volume facing face of the lid, an inwards protruding projection which forms with the pane a second corridor, wherein there is arranged in the second corridor, a sealing ring adapted to provide an elastic seating of the pane.

10. A housing of a field device of measurement and automation technology, comprising:
   a housing body having a housing wall enclosing an internal volume;
   a lid, which is applied at an opening of the housing wall and tightly sealing such;
   wherein the lid includes an annular body and a pane, wherein the annular body is applied at the opening and secured to the housing body, and wherein the pane is inserted in the annular body and seals the opening;

wherein the pane has two opposite faces and an edge;

wherein the edge has a groove running around the pane, wherein the annular body has an inner groove, wherein the groove of the annular body surrounds the groove of the pane, wherein the groove of the annular body and the groove of the pane form a first corridor;

wherein the first corridor is filled out with a sealing compound and/or wherein a cable or a plurality of spheres is present in the first corridor;

wherein annular body and/or the pane have/has at least one inlet for insertion of the spheres, or the cable.

11. A field device of measurement and automation technology, comprising:

a housing including:

a housing body having a housing wall enclosing an internal volume;

a lid, which is applied at an opening of the housing wall and tightly sealing such;

wherein the lid includes an annular body and a pane, wherein the annular body is applied at the opening and secured to the housing body, and wherein the pane is inserted in the annular body and seals the opening;

wherein the pane has two opposite faces and an edge;

wherein the edge has a groove running around the pane, wherein the annular body has an inner groove, wherein the groove of the annular body surrounds the groove of the pane, wherein the groove of the annular body and the groove of the pane form a first corridor;

wherein the first corridor is filled out with a sealing compound and/or wherein a cable or a plurality of spheres is present in the first corridor;

a measuring transducer;

an electronic measuring/operating circuit for operating the measuring transducer and for providing measured values of a measured variable, wherein the electronic measuring/operating circuit is arranged in the housing;

wherein annular body and/or the pane have/has at least one inlet for insertion of the spheres, or the cable.

\* \* \* \* \*